(12) United States Patent
Klee et al.

(10) Patent No.: US 11,119,931 B1
(45) Date of Patent: Sep. 14, 2021

(54) DATA PIPELINE FOR MICROKERNEL OPERATING SYSTEM

(71) Applicant: Facebook Technologies, LLC, Menlo Park, CA (US)

(72) Inventors: Christoph Klee, Snoqualmie, WA (US); Bernhard Poess, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 86 days.

(21) Appl. No.: 16/575,196

(22) Filed: Sep. 18, 2019

(51) Int. Cl.
| | |
|---|---|
| *G06F 12/00* | (2006.01) |
| *G06F 12/0855* | (2016.01) |
| *G06F 12/0873* | (2016.01) |
| *G06F 9/54* | (2006.01) |
| *G06F 12/14* | (2006.01) |
| *G06F 12/109* | (2016.01) |

(52) U.S. Cl.
CPC ......... *G06F 12/0855* (2013.01); *G06F 9/544* (2013.01); *G06F 12/0873* (2013.01); *G06F 12/109* (2013.01); *G06F 12/1441* (2013.01)

(58) Field of Classification Search
CPC .. G06F 12/0855; G06F 9/544; G06F 12/0873; G06F 12/109; G06F 12/1441
See application file for complete search history.

(56) References Cited

U.S. PATENT DOCUMENTS

| 10,877,822 | B1 * | 12/2020 | Wang | ..................... | G06F 9/544 |
| 2011/0286463 | A1 * | 11/2011 | Tse | ......................... | H04L 49/90 370/400 |
| 2013/0246714 | A1 * | 9/2013 | Lv | ........................... | G06F 9/466 711/147 |
| 2014/0317380 | A1 * | 10/2014 | Yamamoto | ............ | G06F 9/4881 712/30 |
| 2015/0046661 | A1 * | 2/2015 | Gathala | ................... | G06F 9/544 711/147 |
| 2015/0347302 | A1 * | 12/2015 | Hagersten | ........... | G06F 12/0862 711/122 |
| 2017/0115923 | A1 * | 4/2017 | Hurvitz | ................. | G06F 12/023 |

(Continued)

FOREIGN PATENT DOCUMENTS

CN 101296157 A * 10/2008

OTHER PUBLICATIONS

Love, Robert, *Linux system programming: talking directly to the kernel and C library*. "O'Reilly Media, Inc." Chapter 4, May 14, 2013.

*Primary Examiner* — John A Lane
(74) *Attorney, Agent, or Firm* — Baker Botts L.L.P.

(57) ABSTRACT

In one embodiment, a method includes receiving a request to create a data pipeline by an operating system executing on a computing device. The operating system allocates a shared virtual memory region for the data pipeline. The shared virtual memory region is mapped to a first virtual address space of a first process and a second virtual address space of a second process. The mapping enables the first process and the second process to share data through the shared virtual memory region. Membership information associated with the data pipeline is updated to include the first process and the second process. An access request for accessing the shared virtual memory region is received from the first process, and the access request is granted or denied based on one or more protection policies.

20 Claims, 7 Drawing Sheets

(56) References Cited

U.S. PATENT DOCUMENTS

| | | | |
|---|---|---|---|
| 2018/0239617 A1* | 8/2018 | Zusman | G06F 16/258 |
| 2019/0073316 A1* | 3/2019 | Sysoev | H04L 67/10 |
| 2019/0227804 A1* | 7/2019 | Mukherjee | G06F 9/3806 |
| 2020/0242043 A1* | 7/2020 | Yang | G06F 9/54 |
| 2020/0348959 A1* | 11/2020 | Krasner | G06F 9/5027 |

* cited by examiner

DATA PIPELINE FOR MICROKERNEL OPERATING SYSTEM

TECHNICAL FIELD

This disclosure generally relates to operating systems of computing devices. More particularly, in certain embodiments, this disclosure is related to a data pipeline for a microkernel operating system.

BACKGROUND

An operating system of a computing device is generally a collection of software that facilitates user interaction with the computing device by managing and coordinating processes associated with the device software and hardware. An operating system may coordinate scheduling of tasks, use of processor time, use of system memory, communication with input/output devices, and the handling of other system resources. Operating systems generally include two virtual memory regions, one corresponding to a user space in which user-facing processes are executed and the other corresponding to a kernel space, which coordinates certain functions of the user-space processes and facilitates communication with device hardware.

SUMMARY OF PARTICULAR EMBODIMENTS

In an operating system with a monolithic kernel design, kernel components freely communicate with each other. Meanwhile, in an operating system with a microkernel design, most system components are implemented as independent user-space processes that may communicate with each other via inter-process communication (IPC), which can be inefficient and resource intensive. This disclosure encompasses the recognition of the previously unrecognized need for more efficient communication between user-space processes, while preserving isolation provided by the microkernel (i.e., by assigning different user-space address spaces to different user-space processes). Previous approaches to providing communication between user-space processes with fewer IPC system calls require processes to be tightly coupled (i.e., not isolated or independent). For example, a first entity may be required to not alter a file while it is in the process of being shared with a second user-space service. Shared memory spaces between the user-space processes may also be used to facilitate communication. However, configuring communication via shared memory spaces may also require the processes to be tightly coupled, such that isolation between the different user-space address spaces of the processes is not guaranteed, potentially compromising the security and reliability of the system.

The specially designed data pipeline of the present disclosure overcomes the drawbacks of previous communication strategies between user-space processes in a microkernel operating system. Tasks performed by the operating system and processes running on top of the operating system generally involve communication between user-space processes (e.g., application(s) and service(s)) and the kernel. The data pipeline described in this disclosure tracks processes that may be involved in processing a task and thus have the need for zero-copy access to a payload (i.e., any information being transmitted between processes to accomplish the task). Zero-copy access to the payload of the task is provided through shared virtual memory mappings, so that multiple copy operations can be avoided if possible. Since members of a data pipeline cannot generally trust each other due to their isolation, the data pipeline provides an array that outlines protection flags for each mapping inside the shared virtual memory region. Before an entry is read from the shared virtual memory, flags associated with the entry are checked against the array to verify that the entry is validated or trusted and should be read. For example, when a member of the data pipeline needs to read from memory or write to memory that is associated with the data pipeline, the member must determine, based on the protection flags, whether access to the memory is permitted (e.g., legitimate). If this is not the case, the read or write task is failed (i.e., not allowed to proceed). While payload data (e.g., a web page) may be mapped to a virtual address space of each application, message data (e.g., commands for a WiFi or 5G service) may be used exclusively for communication between exactly two components and may not be reflected in the mapping. In some embodiments, when a memory mapping that is part of a data pipeline is to be unmapped from the data pipeline, each member of the data pipeline must consent to the unmapping in order for it to proceed.

The data pipeline, and associated systems and methods, of the present disclosure may also be implemented into practical applications in which power efficiency is a concern. For instance, the data pipeline may particularly be integrated into applications involving portable systems, wearable systems, and/or artificial reality systems. While at times this disclosure refers to various systems and methods implemented in the context of a microkernel operating system, it should be understood that systems and methods described may also be applied with an operating system with a monolithic kernel configuration.

In particular embodiments, a method includes receiving a request to create a data pipeline by an operating system executing on a computing device. The operating system allocates a shared virtual memory region for the data pipeline. The shared virtual memory region is mapped to a first virtual address space of a first process and a second virtual address space of a second process. The mapping enables the first process and the second process to share data through the shared virtual memory region. Membership information associated with the data pipeline is updated to include the first process and the second process. An access request for accessing the shared virtual memory region is received from the first process, and the access request is granted or denied based on one or more protection policies.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
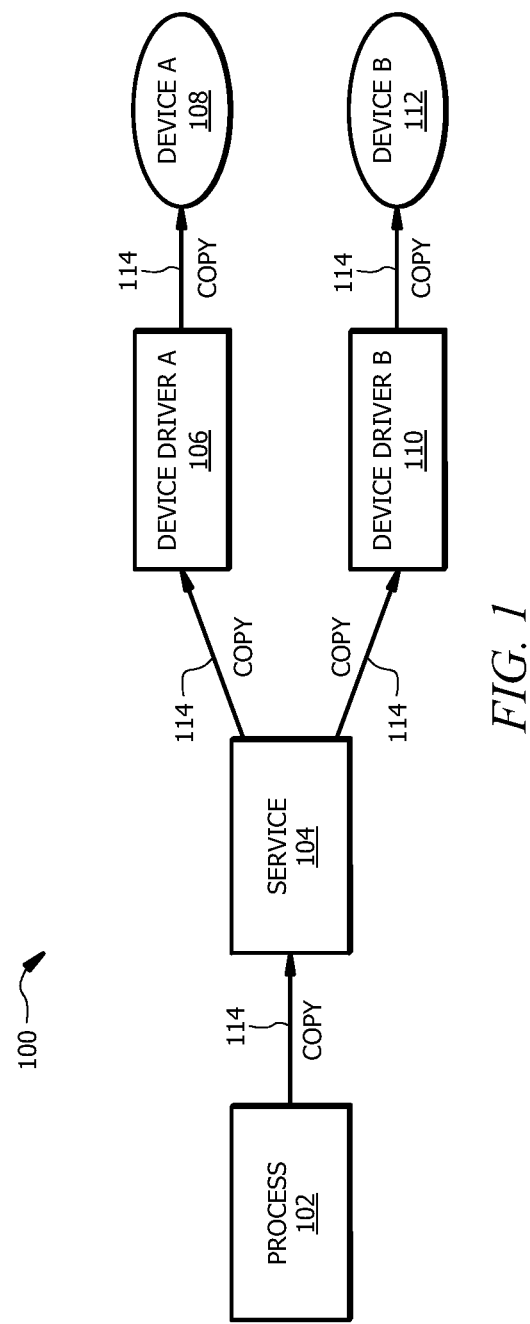
FIG. 1 illustrates an example of a conventional communication between components associated with performing a task.

FIG. 1 is a diagram 100 illustrating conventional data communication between various components including a process 102, a service 104, device drivers 106, 110, and corresponding devices 108, 112. Communication between these components may be associated with performing a task (e.g., connecting to a network). As described above, in an operating system with a microkernel design, most tasks are implemented by copying information into a memory buffer associated with each independent user-space process associated with the task. For example, communication channels 114 may be used to copy information along the chain of components from application 102 to each of the devices 108 and 112 in order to perform a task. This copy-based communication strategy may be implemented via inter-process communication (IPC) (e.g., such that communication channels 114 are IPC channels), which can be inefficient and resource intensive. This disclosure particularly encompasses the recognition of a need for more efficient communication strategies that facilitate communication between components performing a task with fewer or zero copies.

Figure 2:
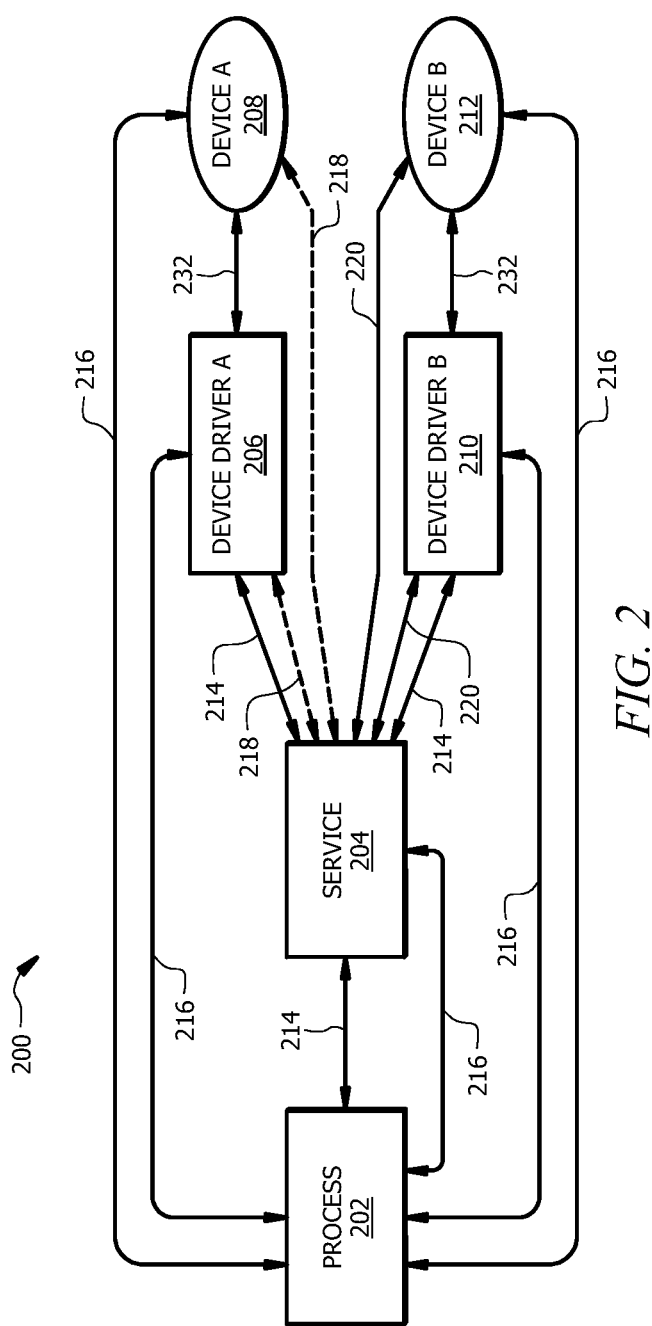
FIGS. 2 and 3 illustrate examples of data pipelines configured to provide zero-copy communication between components associated with performing a task, according to illustrative embodiments of this disclosure.

FIG. 2 is a diagram 200 illustrating communication between components including process 202, service 204, device drivers 206, 210, and devices 208, 212 via data pipelines 216, 218, and 220. Certain embodiments provide one or more solutions to the problems of the copy-based communication strategy illustrated in FIG. 1. As described above, communication between the components (i.e., the process 202, service 204, device drivers 206, 210, and/or devices 208, 212) is needed in order for the components to perform tasks. A task may refer to any action to be performed by one or more applications, services, and/or devices of a computing device. An example of a task may be to read a video from a given file at a particular offset into a buffer located at a given address. As another example, a task may be associated with an event that informs an application about new data (e.g., that a network packet is located at a given address and has a given length).

The process 202 may correspond to an instance of an executed program. As used in this disclosure, a process may be referred to as an application. In general, an application may be associated with a single process or multiple processes (e.g., executing together or simultaneously). The service 204 may be any appropriate executable program for facilitating function of the device drivers 206, 210 and the corresponding devices 208, 212. The device drivers 206, 210 may be any appropriate executable program for facilitating function of the corresponding device 208, 212. For example, if device driver 206 is a WiFi driver and device 208 is a WiFi device, the service 204 may be a network service. For example, network service 204 may be associated with establishing a connection to a network (e.g., to a cellular network, e.g., to the Internet). Likewise, if the device driver 210 is a cellular device driver (e.g., a 5G driver) and device 212 is a cellular device (e.g., a 5G device), the service 204 may be a network service.

The first data pipeline 216 facilitates zero-copy communication (i.e., communication that does not require repeated copies as shown in FIG. 1) between the process 202 and each of the service 204, the first device driver 206, the first device 208, the second device driver 210, and the second device 212. The components that communicate via a given data pipeline are referred to in this disclosure as "members" of the data pipeline, and the process that creates a data pipeline is referred to as the "owner" of the pipeline. For example, the members of data pipeline 216 include server 204, device drivers 206, 210, and devices 208, 212. Process 202 is the owner of data pipeline 216. The second data pipeline 218 facilitates communication between the service 204 (the owner of data pipeline 218) and each of the first device driver 206 and the first device 208 (e.g., the members of the second data pipeline 218 include the first device driver 206, and the first device 208). The third data pipeline 220 facilitates communication between the service 204 (the owner of data pipeline 220) and each of the second device driver 210 and the second device 212 (e.g., the members of the third data pipeline 220 include the second device driver 210, and the second device 212). Accordingly, rather than requiring communication along the chain of components (e.g., via communication channels 114 of FIG. 1), the data pipelines 216, 218, and 220 of FIG. 2 facilitate direct and copy-less communication between non-adjacent members of the data pipelines. While the example of FIG. 2 shows three pipelines 216, 218, 220, it should be understood that the service 204 may be associated with additional (e.g., up to hundreds or more) data pipelines. The performance of the service 204 is generally independent of the number of data pipelines with which it is associated.

As described in greater detail with respect to FIG. 3 below, the data pipelines 216, 218, and 220 are established through shared virtual memory regions which are mapped to virtual address spaces associated with each member of the corresponding data pipeline. A virtual memory region may be a contiguous region of virtual memory which may contain one or more virtual memory mappings. Generally, a memory region may be sparse (i.e., not every page in the region may be mapped), and access rights for different virtual memory mappings may be different for different components of the data pipelines 216, 218, 220. A virtual memory mapping may be a contiguous virtual memory mapping where all pages are present for each component and each component has the same access rights. By referencing shared virtual memory regions for the payload of a message, zero-copy communication can be achieved across the chain of components involved in processing the payload.

The data pipelines 216, 218, 220 track the different components that are potentially involved in processing a task and may have a need for zero-copy access to a payload which must be communicated between the components to perform the task. In general, each of the data pipelines 216, 218, 220 is a dynamic construct that can change over time. For instance, services can join or leave the data pipelines 216, 218, 220 as needed (e.g., according to certain rules and/or criteria described in this disclosure). For example, if the computing device is switched into an "airplane mode," service(s) and/or device(s) associated with cellular services (e.g., a 5G stack) may be disabled and removed from the data pipelines 216, 218, 220. Meanwhile, in a normal mode, service(s) and/or device(s) may remain a part of or be added back to the data pipeline 200. Generally, a predefined activity policy is used to determine which application(s), service(s) and/or device(s) are currently active and, based on this determination, to update all the data pipelines 216, 218, 220 (and any other active data pipelines) that involve these application(s), service(s) and/or device(s). For example, an activity policy may define which members of a data pipeline are added and/or removed from a data pipeline in response to a given change (e.g., of device status or task requirement).

As shown in FIG. 2, direct communication channels 214 may also be provided for direct peer-to-peer communication between adjacent components associated with a task. Channels 214 may be, for example, IPC channels or individual data pipelines. Channels 232 for communication between device drivers 206, 210 and the corresponding devices 208, 212 are generally device-specific communication channels such as memory-mapped device registers. The data pipelines 216, 218, 220 may include both mappings to address spaces of the members as well as input-output memory management unit (IOMMU) mappings, as needed, for communication with the devices 208, 212.

Figure 3:
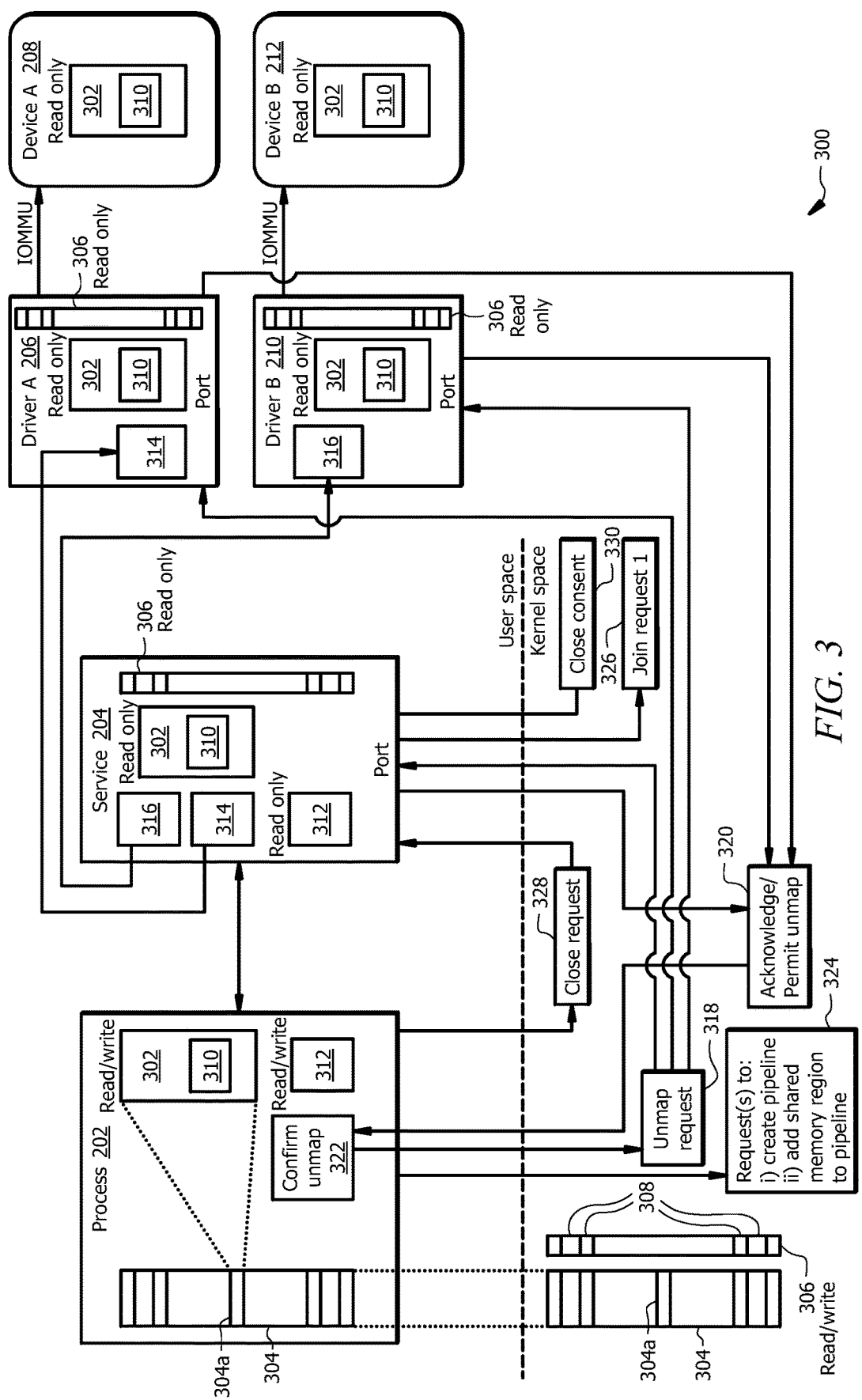

FIG. 3 is a diagram 300 illustrating the underlying virtual memory mappings associated with the example data pipeline 216 of FIG. 2, which, as described above, facilitates communication between process 202, service 204, device drivers 206, 210, and devices 208, 212 (i.e., the components of the data pipeline 216). The data pipeline 216 establishes shared virtual memory regions 302 across all members 204, 206, 208, 210, 212 of the data pipeline and establish IOMMU mappings if required (e.g., for communication with device 208, 212). Each member of the data pipeline 216 may "see" the same mappings, and the mappings can only be changed by the owner of the pipeline (i.e., the creator of the data pipeline). For example, if the data pipeline of FIG. 3 was created by process 202, then only process 202 may be permitted to modify mappings of the pipeline. A region 304a of memory buffer 304 corresponds to the shared virtual memory region 302 that is mapped to a virtual address space associated with each member of the data pipeline. In some embodiments, the memory buffer 304 and/or the shared virtual memory regions 302 may be implemented using a ring buffer for communication between members of a data pipeline.

The shared virtual memory regions 302 facilitate communication of a payload information 310, which may reference a payload (e.g., data stored in a memory region) which is used to execute a task by the data pipeline 216. In general, payload information 310 may refer to any information to be communicated between members of a data pipeline. For example, payload information 310 may reference one or more virtual memory regions that contain payload data associated with performing a task. A payload may span multiple different shared memory regions, and these shared memory regions may, in some cases, be "owned" by different data pipelines. For instance, process 202 may send a request referencing memory managed by data pipeline 216 to service 204 using the direct communication channel 214. While this request may already be viewable by driver 206 via the shared memory region of pipeline 216, service 204 may still send the request to 206 via the direct communication channel 214. For example, the service 204 may send a request with an appropriate header appended in front of the request payload received from process 202. Accordingly, driver 206 may receive a request that spans multiple shared memory regions that can belong to different data pipelines (e.g., pipelines 216 and 218 in this illustrative example). A payload may correspond to one or more shared memory buffers associated with a task. For example, a shared memory buffer may be a source buffer for a write or send task. As another example, a shared memory buffer may be a destination buffer for a read or receive task. As used in some cases in this disclosure, messages, such as message 312, 314, 316 of FIG. 3, may be peer-to-peer communications between two user space applications that are related to a task, action, or event. In general, the format of a messages 312, 314, 316 only needs to be understood by the sender and receiver of the message.

Since members of a data pipeline generally cannot trust each other, an array 306 is included which outlines protection flags 308 for each mapping in the shared virtual memory region 302. For example, the array 306 may be a read-only array that provides the read/write permissions for every page of the shared virtual memory region 302. This array 306 is generally mapped into the address space of each member of the data pipeline, as shown in FIG. 3, such that only one copy of the array 306 must be maintained. Generally, the kernel has read/write access to array 306, while components in the user space read only access (as depicted in FIG. 3). Each mapping operation is reflected in the array 306 as part of a map or unmap call by the kernel. The array 306 generally provides an efficient means for tracking all individual page permissions (e.g., only 2 bits per page may be required for the array 306). The protection flags 308 provide tracking data structures for each member of the data pipeline, thereby protecting against page faults caused by unmap requests for memory that is used for active tasks. In some embodiments, when a member of the data pipeline reads from memory or writes to memory that is part of the data pipeline, the member determines whether access is permitted based on the protection flags 308 (e.g., as described in greater detail below with respect to FIGS. 4A-C). If access is not permitted, the requested (e.g., the read or write) operation is failed, thereby preventing a malicious application from causing another application to crash (e.g., because of a page protection violation). In some embodiments, each member of the data pipeline has a private array that tracks, for each page, the current reference count as well as whether an unmap operation has been issued. As long as each member of the data pipeline correctly updates this private array, unmap calls are generally appropriately handled to further protect against malicious attacks.

In general, the owner (e.g., creator) of a data pipeline can attach virtual memory address regions to the data pipeline. For example, a data pipeline may support virtual memory address regions that are a multiple of 2 mebibyte (MiB) or 1 gibibyte (GiB) regions. In some embodiments, the size of a virtual memory address region is configured to ensure that a single mapping operation is visible across all address spaces that are part of the data pipeline. To achieve this, virtual memory address regions that are a multiple of 2 MiB in size may have all level-one page tables pre-allocated, and virtual memory address regions that are multiples of 1 GiB regions may have all level-two page tables pre-allocated. All pre-allocated page tables may be mapped into the address spaces of all members of the data pipeline, thereby ensuring that any subsequent mapping operation is visible in all member address spaces (e.g., at the same time). In general, page tables used by an IOMMU (e.g., to communicate with a device) may be different than the page tables associated with the data pipeline. However, the IOMMU-related page tables may be shared among devices that share a mapping (e.g., devices that are members of the same data pipeline). In some embodiments, virtual memory address regions that are a multiple of 1 GiB are permitted to leverage large pages (e.g., with a memory of 2 MiB or greater) for individual mappings because only the level-two page tables have been pre-allocated, virtual memory address regions that are only a multiple of 2 MiB are restricted to mappings leveraging individual 4 kibibyte (KiB) pages, because the level-one page tables have already been established.

To protect against out-of-bound buffer access, the creator process of the data pipeline may establish sparse memory mappings in the virtual memory address region such that at least one logical memory region (e.g., with a size of at least 4 KiB of virtual address space) is kept unmapped. These unmapped regions may act as guard pages. Guard pages may be especially beneficial when the virtual memory address region is partitioned into regions with read-write and read-only permission. Guard pages may be placed between these regions.

To further facilitate secure communication, protections flags 308 are generally associated with mappings and/or the data associated with given mappings to facilitate improved security. For instance, a data mapping that only needs to be read by members of the data pipeline is generally mapped as a read-only mapping (i.e., rather than a read-write mapping). Moreover, if data is encrypted and/or decrypted by a service, the shared mappings to transport the unencrypted data is generally not directly accessible by a device. Instead, only the data regions representing the encrypted memory are shared with the corresponding device driver. For example, an owner of a data pipeline can enforce these rules by prohibiting a data pipeline from providing IOMMU access to the memory region associated with decrypted data.

In general, a memory mapping that is part of a data pipeline cannot be unmapped without certain criteria being satisfied. For example, to guarantee that access to an established memory mapping is safe (e.g., permitted), a memory mapping may only be removed after consent is received from each member of the pipeline. As such, an unmap operation for a virtual memory region, or for an individual memory mapping, may involve an unmap request 318 issued by the creator of the data pipeline. The unmap request 318 may be provided to each member of the pipeline to confirm that the unmapping is permitted and safe, as illustrated in FIG. 3. Responsive to receipt of the unmap request 318, each member determines whether to provide consent to the unmap request 318. If the unmap request 318 is accepted an acknowledgment 320 is returned. After an acknowledgement 320 is received by the kernel from each member of the data pipeline, the kernel performs the requested unmap operation. The kernel may subsequently issue an unmapping confirmation 322 to the owner of the pipeline (process 202). In other words, in some embodiments, the data pipeline may only perform an unmap operation, or allow an unmap operation to be performed, if all members of the data pipeline confirm that the unmap operation is permitted.

Unmapping virtual memory regions from a data pipeline is described in greater detail below, for example, with respect to FIG. 4B. However, as a brief example, if a mapping is part of the data pipeline, an unmap call may be issued to unmap a portion of the virtual memory region from the data pipeline. The unmap call may be an asynchronous system call. The unmap call may initiate the following sequence of events:

1. Send to each member of the data pipeline (e.g., over a port notification or an IPC channel), a message describing the unmap operation, and specify a timeout period of time for the unmap operation.

2. Schedule a timer for the timeout period.

3. Return from the system call.

4. Restrict access to the memory region requested to be unmapped by marking the pages for unmapping in page reference counting and unmap tracking arrays associated with each member.

5. For each member of the data pipeline, if the reference count for all pages requested for unmap is zero, the member sends a confirmation that the unmap operation can proceed (e.g., via a system call). If one or more members do not confirm the unmap operation within the timeout period, the kernel may terminate the application(s).

6. Following receipt of confirmation from each member, the kernel may unmap the region by:

6a. Updating the page table entries to remove the mapping by setting the present bit to false, performing associated translation lookaside buffer (TLB) flushes, and marking pages 308 as no longer being present in structure 306;

6b. Informing every member of the data pipeline that the unmap operation has completed by sending a message over an IPC channel;

6c. If the page reference count is zero, freeing the page;

6d. Updating the page table entries to zero out the page table entries, facilitating re-use of the virtual address space region; and 6e. Informing the creator of the data pipeline that the unmap operation has been completed by sending a message over an IPC channel.

In an example operation of the data pipeline illustrated in FIG. 3, a request 324 is received to create the data pipeline by an operating system (e.g., operating system 500 described below with respect to FIG. 5) executing on a computing device (e.g., device 600 described below with respect to FIG. 6). For example, the kernel of the operating system may receive the request 324 (e.g., from process 202) to create a data pipeline. The same request 324 and/or one or more an additional request to the kernel may cause a shared memory region 302 to be associated with the data pipeline. For example, the request may specify whether the shared memory region 302 should only be shared with read-only permission, even if the region in the owner address space may allow read-write access. Following the association of the shared memory region 302 with the data pipeline, each member may receive a port notification describing the new shared memory region 302 (e.g., identified through a handle). Library code in each member process may handle the port notification, accept the shared memory region 302 into its address space, map the protection flags array, and create the tracking array for page reference counting. As shown in FIG. 3, the shared virtual memory region 302 is mapped to a first virtual address space of the first process 202 and to virtual address spaces of the other members of the data pipeline. These mappings facilitate sharing of information through the shared virtual memory region without requiring that the information be copied. Membership information associated with the data pipeline (e.g., information reflected in the protection flags 308) is updated to include each member of the pipeline.

In some embodiments, another component may request to join a data pipeline. In general, when a new member joins a pipeline, the new member is provided with all the existing shared regions. We could have also decided to do all these operations from the kernel, but since we are working on a microkernel, the kernel just provides the required information for user space to establish all the relevant mappings. For example, as shown in the example of FIG. 3, the service 204 may request to join the data pipeline. For example, a join request 326 may be received form the service 204 to join the data pipeline. The join request 326 may include a handle corresponding to an IPC channel associated with the service 204. Responsive to the join request 326, the shared virtual memory region 302 may be mapped to the virtual address space of the service 204. For example, based on the flags in the protection array 308 associated with the mapping of the shared virtual memory region 302 the service 204 may determine whether access to the virtual memory region 302 is permitted or must be denied. Other components may request to join a data pipeline in the same or a similar manner.

As described in greater detail below (e.g., with respect to FIG. 4C), in some embodiments, only the creator (e.g., process 202) of a data pipeline may be permitted to close the data pipeline. For example, as shown in FIG. 3, a close request 328 may be received from the process 202 to close the data pipeline. In some embodiments, the data pipeline may be closed in response to the close request from the pipeline-creator process 202. In other embodiments, in response to the close request 330, the operating system determines whether all members of the data pipeline consent to closing the data pipeline (e.g., based on whether consent 330 to close the data pipeline is received form each member). If all members consent to closing the data pipeline, the data pipeline may be closed.

Figure 4A:
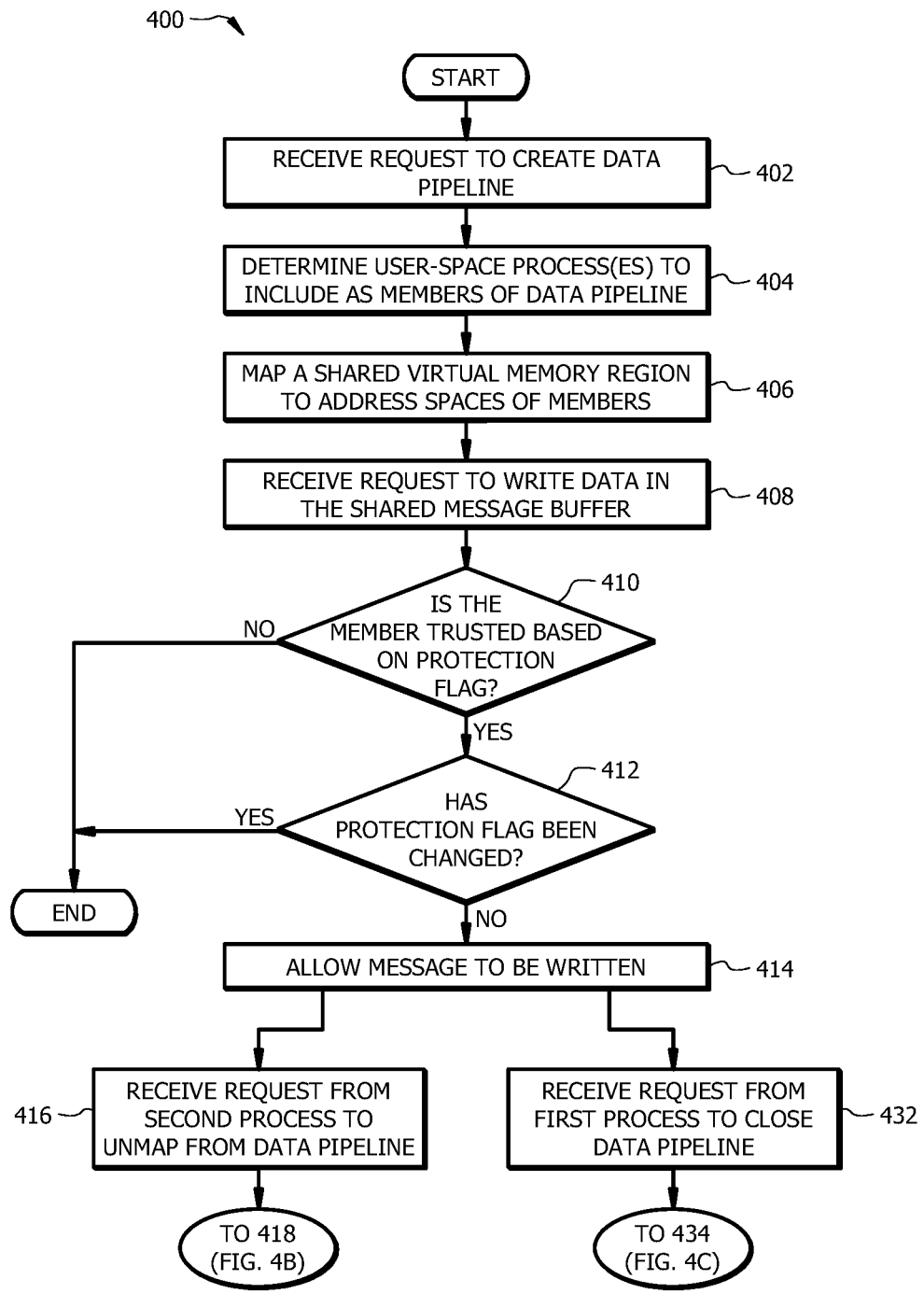
FIGS. 4A-C illustrate example methods of creating and operating a data pipeline, according to illustrative embodiments of this disclosure.
Figure 4B:
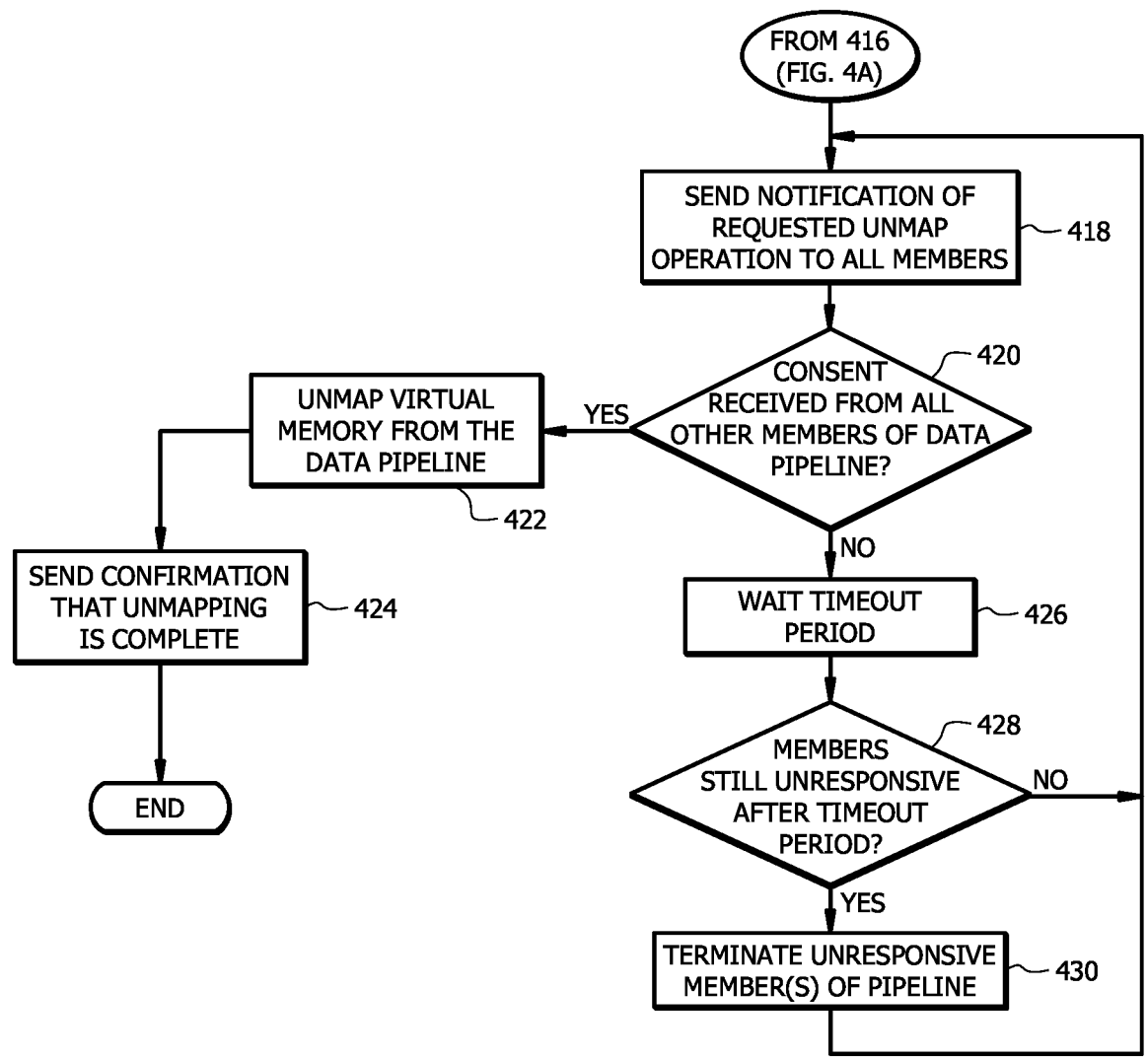
Figure 4C:
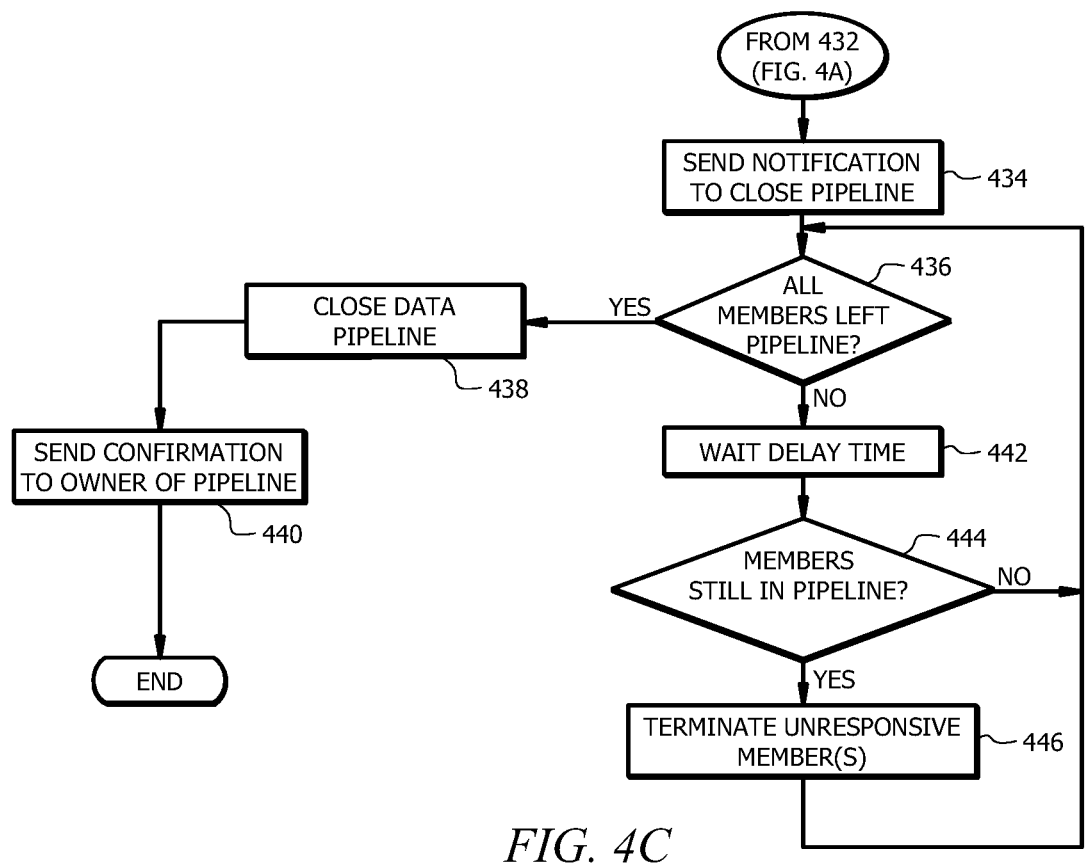

FIGS. 4A-C illustrate an example method 400 for creating and operating a data pipeline (e.g., any of the data pipelines 216, 218, 220 of FIG. 2). The method 400 may begin at step 402, where a request is received (e.g., from the owner process) to create the data pipeline. For example, a create-pipeline request 324 may be received from a creator process (e.g., process 202 with respect to data pipeline 216 of FIG. 2). The received request 324 may also be associated with adding a shared virtual address space region to the data pipeline. In some embodiments, a separate request is received to add the shared virtual address space region to the data pipeline. At step 404, other processes which may be part of the data pipeline are determined. For example, the request received at step 402 may be associated with a particular task, and the task may be associated with one or more known processes. For instance, if the request is associated with a task of connecting to a network, other processes, services, and devices associated with connecting to a network may be determined as perspective members of the data pipeline. Members of the data pipeline may also or alternatively be determined based on one or more join requests received from processes (e.g., join request 326 of FIG. 3).

At step 406, a shared virtual memory region (e.g., region 302 of FIG. 3) is mapped to a virtual address space of each member of the data pipeline determined at step 404. In other words, the shared virtual memory region is added to the data pipeline. Step 406 may involve, the kernel pushing a notification (e.g., an IPC notification) to each prospective member of the data pipeline. When a member joins the data pipeline, the member may accept the new region into the address space, map protection arrays (e.g., array 306 of FIG. 3), and set up a data structure to track pin counts. The member may pass an IPC channel endpoint to the kernel. This IPC channel may be used by the kernel to communicate with the member. In general, the kernel communicates with the members of a data pipeline during certain control-plane operations such as unmapping operations or operations associated with establishing new virtual address space regions that are part of a data pipeline. To establish a new mapping within a data pipeline, for example, the owner (e.g., creator) of the data pipeline may use a map system call. The kernel tracks virtual memory address region associated with the data pipeline, so that updates can be performed to establish the mapping across all address spaces associated with the data pipeline.

For instance, when the kernel receives the map call and has determined that the virtual memory address region is associated with the data pipeline, the kernel performs a series of steps to update the mapping. First, the kernel may determine whether the memory region within the virtual memory address region described by the mapping request is available (e.g., empty or otherwise available for use in the data pipeline). If the memory region is not available, the map call is generally rejected, because it would result in changes to mappings already established in the described region. Second, the kernel may determine whether all pages of the mapping are allocated. If pages of the mapping are not allocated, the remaining pages may be allocated. The kernel may then pin the pages to prevent an unmap operation of the pages while they are part of the data pipeline. The kernel then establishes the mapping with the requested protection flags in the affected page table entries of the address spaces. The kernel then establishes the mapping in the related IOMMU page tables, for example, if the data pipeline is configured with device access (e.g., for communication with devices such as devices 208, 212 of FIGS. 2 and 3). The kernel may then update the affected shared page protection array entries to reflect the newly established mapping.

To facilitate secure communication via the shared virtual memory region described above, rules and/or criteria for safely handling (e.g., reading and writing) shared data are provided. For example, the data pipeline may provide at least the following guarantees about a mapping: (1) a mapping that is part of a data pipeline cannot have the executable flag set; (2) the protection flags (e.g., read/write permissions) of an established mapping cannot change; and (3) an established mapping can only be unmapped if all members of the data pipeline consent to the unmapping. For example, guaranteeing that read/write protection flags of a mapping cannot change provides an assurance that any protection check that is performed yields the same result as long as a mapping exists. The data pipeline generally does not permit direct unmap operations of an existing mapping. Instead, consent is required from all members that an unmap operation is permitted. For example, as long as individual members of a data pipeline track the tasks in flight and their respective memory usage (e.g., history of accessing memory), a mapping may remain active at least until every member of the data pipeline has declared that they are no longer accessing the mapping.

To prevent a malicious application from never releasing a mapping (e.g., such that a desired unmapping cannot proceed), the data pipeline may enforce a timeout and subsequently terminate a potentially malicious application that does not release the mapping. To prevent trusted processes from being terminated for responding too slowly to an unmap request (e.g., because the processes are actively performing other tasks), members of the data pipeline may track pending unmap calls and fail any new tasks that reference memory mappings for which they have received an unmap call. This may allow the unmap call to proceed once all tasks have completed that have been received prior to the unmap call itself.

Referring still to FIG. 4A, at step 408, a request is received from a process to write data in the virtual memory region for communication via the data pipeline (e.g., to a write payload information 310, as shown in FIG. 3). At step 410, the user space library code of the data pipeline determines whether the process requesting to write to the shared virtual memory region is trusted (e.g., based on the policies and/or protection flags associated with the data pipeline). For example, the code may determine whether the process associated with the request received at step 408 is a member of the data pipeline. In other words, the code may determine whether the process requesting to write (or send) the data has access to the shared memory region (i.e. is part of the data pipeline with the shared memory region). If the criteria are not satisfied at step 410, the operation may be failed, and the method 400 may end. At step 412, the user space library code of the data pipeline determines whether protection flags allow the request to be processed (e.g., whether the entire memory region described by the shared memory array element is mapped with the appropriate protection flags associated with the request). This may prevent an otherwise unauthorized process from accessing the data pipeline by altering the protection flags of the data pipeline. If the criteria are not satisfied at step 412, the operation may be failed, and the method 400 may end. Steps 410 and 412 may be performed for each array element of a shared memory associated with the request. For example, if criteria are satisfied at steps 410 and 412 are satisfied for each array element, the request is trusted, and the associated memory counts can be increased to mark the involved memory regions as "pinned." An unmap request would be delayed until these memory regions became "unpinned." After the pinning the step 414 can happen, and then the unpin would happen.

At step 414, if the criteria of steps 410 and 412 are satisfied (e.g., or after the subsequent pinning of the associated memory regions), permission is granted to the process, and the process may be permitted to write the data to the shared virtual memory region. After data is written to the shared virtual memory region, the data is automatically available to other members of the data pipeline (i.e., via the mappings described above with respect to FIG. 3). In some embodiments, a member receiving payload information associated with a task determines, for each page of the referenced payload, whether access should be permitted (e.g., based on the protection array). If access is not permitted, the request generally fails. For example, the receiver may not be permitted to read the payload. The receiver may further determine if one or more pages associated with the payload are marked for unmapping. If no pages are marked for unmapping, then future unmap calls may be prevented for a period of time (i.e., delayed). This may help ensure that access to the payload is safe, thereby reducing or preventing problems associated with access violations.

At step 416, a request may be received to unmap a shared memory region from the data pipeline. FIG. 4B shows subsequent steps of the method following receipt of such a request. Referring now to FIG. 4B, at step 418, a notification of the unmap request is provided to each member of the pipeline. At step 420, the kernel determines whether consent is received from all member of the data pipeline. At step 422, if consent is received from all members, the virtual memory address region is unmapped from the data pipeline. At step 424, a confirmation may be transmitted that unmapping is complete before the method ends. If consent is not received from all members at step 420, the kernel waits a timeout period of time at step 426. If the member(s) are no longer unresponsive at step 428, the method may return to step 420 to determine whether consent is received from all member(s) of the data pipeline. Otherwise, if the member(s) are still unresponsive at step 428, the unresponsive member(s) may be terminated, thereby preventing a potentially malicious member from preventing the unmap operation indefinitely, as described above.

Referring again to FIG. 4A, at step 432, a request may be received to close the data pipeline. For example, the request may be received from the creator of the data pipeline (e.g., from the process 202 which created pipeline 216 of FIG. 2). FIG. 4C shows subsequent steps of the method following receipt of such a request. Referring now to FIG. 4C, at step 434, a notification is provided to the members to leave the pipeline. At step 436, the kernel determines if all members left the data pipeline. If all member have left the pipeline, the data pipeline is closed at step 438 and a confirmation of the pipeline closing is sent to the owner of the pipeline at step 440. Otherwise, the method proceeds to step 442. At step 442, if the members have not all left the pipeline, the kernel may prevent the data pipeline from being closed for a period of time to allow unresponsive members additional time to exit the pipeline. If there are one or more unresponsive members still in the pipeline, the kernel may wait a delay time period at step 442. If each member has left the pipeline at step 446, the method may return to step 436 to determine whether all members have left the data pipeline. Otherwise, if member(s) are still in the pipeline at step 444, the unresponsive member(s) may be terminated, thereby preventing a potentially malicious member from preventing the close-pipeline operation indefinitely.

Particular embodiments may repeat one or more steps of the methods of FIGS. 4A-C, where appropriate. Although this disclosure describes and illustrates particular steps of the method of FIGS. 4A-C as occurring in a particular order, this disclosure contemplates any suitable steps of the method of FIG. 14 occurring in any suitable order. Moreover, although this disclosure describes and illustrates an example method for storing a message in a memory buffer including the particular steps of the method of FIGS. 4A-C, this disclosure contemplates any suitable method for storing a message in a memory buffer including any suitable steps, which may include all, some, or none of the steps of the method of FIGS. 4A-C, where appropriate. Furthermore, although this disclosure describes and illustrates particular components, devices, or systems carrying out particular steps of the method of FIGS. 4A-C, this disclosure contemplates any suitable combination of any suitable components, devices, or systems carrying out any suitable steps of the method of FIGS. 4A-C.

Figure 5:
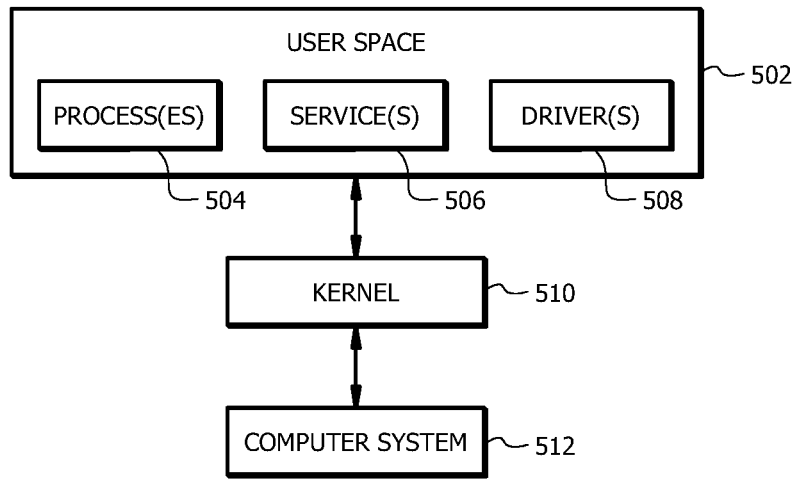
FIG. 5 illustrates an example operating system.

FIG. 5 shows an example operating system 500 in which kernel space or kernel 510 coordinates functions of one or more processes 504, services 506, and/or drivers 508 executed in user space 502 and coordinates implementation of hardware associated with computer system 512. The user space 502 and kernel space 510 generally correspond to portions of virtual memory of the computer system 512. As described above, some operating systems employ a monolithic kernel configuration in which most activities are handled by the kernel 510. For instance, if kernel 510 is a monolithic kernel, it may include device drivers, file system management utilities, and the like. While this approach is sufficient for certain applications, use of an operating system with a monolithic kernel configuration may present significant vulnerabilities with respect to system security and reliability, for example, because any vulnerabilities or failures of the kernel components (e.g., a device driver) can result in kernel instability and subsequent system instability. An alternative to the monolithic kernel configuration is the microkernel configuration in which certain processes and/or tasks that would typically be handled by the kernel 510 (e.g., device driver processes 508, as shown in FIG. 5) are instead executed in the user space 502. The isolated nature of user-space processes in a microkernel operating system generally improves system security and reliability.

As described above, using shared memory for communication facilitates efficient communication between members of a data pipeline. This disclosure further provides for improved security when communication is established via a shared memory region, as in the data pipelines described above with respect to FIGS. 2 and 3. In some embodiments, a data pipeline may provide guarantees that accessing a payload is safe. For example, a data pipeline may be further secured by verifying that certain rules are satisfied such as: (1) that the owner of the data pipeline cannot change protection settings (e.g., protection flags 306 of FIG. 3) and/or (2) that consent is required from every member of the data pipeline to unmap an existing mapping or remove an entire virtual memory address region from the data pipeline. In general, when a member of the data pipeline receives payload information through a shared memory region (e.g., rather than through an IPC channel), the content of the payload information may change over time, because the sender of the payload information can generally modify the payload information at any time. This disclosure encompasses various approaches to ensuring effective communication in light of these conditions. In some embodiments, the member receiving payload information may create a copy of the payload information such that the member receiving the payload information is not affected by any subsequent changes made be the sender. Generating this copy may not require an additional expenditure of resources because most members of a data pipeline also communicate with other members through peer-to-peer messaging, which may involve generating a copy. The memory used for direct peer-to-peer messages (e.g., messages 312, 314, 316 of FIG. 3) is generally only shared between two members of the pipeline.

In various embodiments, the data pipelines described in this disclosure may provide improved power efficiency compared to previous communication strategies. Example sources of power consumption include those associated with processing tasks and waking up members of a data pipeline to complete a task. For instance, in some cases, waking up a process may involve activating an otherwise idle core, thereby resulting in a considerable consumption of power. Power consumption also depends at least in part on the time during which the data pipeline processes a task. In order to achieve improved power efficiency compared to that of previous technology, techniques described in this disclosure may be used to balance the power costs of waking up sleeping processes and of continuously performing tasks. In some embodiments, multiple tasks may be performed in batches to further improve efficiency. As such, a data pipeline may be active for a period of time (e.g., to perform a batch of tasks), followed by an idle period during which the system may conserve power.

Figure 6:
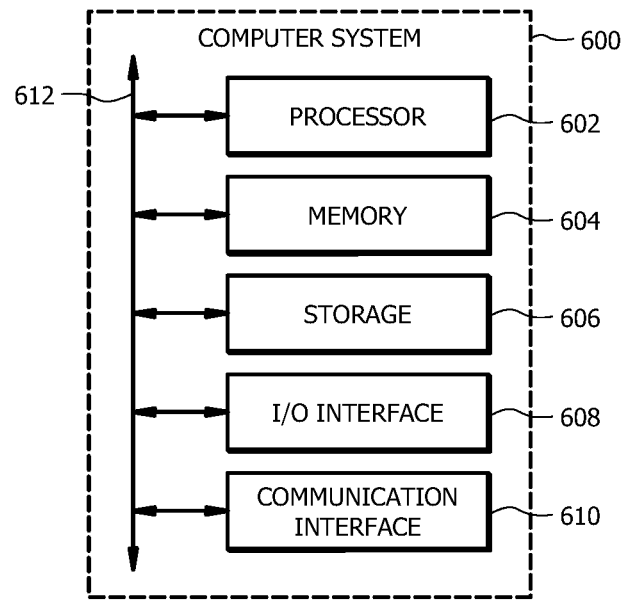
FIG. 6 illustrates an example computer system for use in any of the embodiments described in this disclosure.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an operating system executing on a computing device:
   receiving a request to create a data pipeline;
   allocating a shared virtual memory region for the data pipeline;
   mapping the shared virtual memory region to a first virtual address space of a first process and a second virtual address space of a second process, wherein the mapping enables the first process and the second process to share data through the shared virtual memory region;
   updating membership information associated with the data pipeline to include the first process and the second process;
   receiving, from the first process, an access request for accessing the shared virtual memory region;
   granting or denying the access request based on one or more protection policies;
   receiving an unmapping request from the second process to unmap the shared virtual memory region from the second virtual address space of the second process;
   responsive to the unmapping request, determining whether all members of the data pipeline consent to unmapping the shared virtual memory region from the second virtual address space of the second process;
   responsive to a determination that all members of the data pipeline consent to the unmapping, unmapping the shared virtual memory region from the second virtual address space of the second process; and
   updating the membership information associated with the data pipeline to remove the second process.

2. The method of claim 1, wherein mapping the shared virtual memory region to the first virtual address space of the first process and the second virtual address space of the second process comprises:
   after mapping the shared virtual memory region to the first virtual address space, adding the shared virtual memory region to the data pipeline;
   receiving a second request from the second process to join the data pipeline; and
   responsive to the second request, mapping the shared virtual memory region to the second virtual address space of the second process.

3. The method of claim 1, wherein the request to create the data pipeline is received from the first process.

4. The method of claim 1, wherein the shared virtual memory region is associated with a protection array, the protection array comprising one or more protection flags for each mapping of the shared virtual memory region; and
the method further comprising:
determining, based on a first flag of the protection array associated with the mapping of the shared virtual memory region to the second virtual address space of the second process, whether access to the shared virtual memory region by the second process is granted or denied; and
responsive to a determination that access to the shared virtual memory region by the second process is granted, allowing the second process to access the shared virtual memory region.

5. The method of claim 1, further comprising:
receiving a join request from a third process to join the data pipeline, wherein the join request comprises receiving a handle corresponding to an inter-process communication channel associated with the third process;
responsive to the join request, mapping the shared virtual memory region to a third virtual address space of the third process; and
updating the membership information associated with the data pipeline to include the third process.

6. The method of claim 1, further comprising:
receiving a close request from the first process to close the data pipeline;
responsive to the close request, determining whether all members of the data pipeline consent to closing the data pipeline; and
responsive to a determination that all members consent to closing the data pipeline, closing the data pipeline.

7. The method of claim 1, wherein the protection policies comprise one or more rules associated with read and write privileges of members of the data pipeline in the shared virtual memory region.

8. One or more computer-readable non-transitory storage media embodying software that is operable when executed to:
receive a request to create a data pipeline;
allocate a shared virtual memory region for the data pipeline;
map the shared virtual memory region to a first virtual address space of a first process and a second virtual address space of a second process, wherein the mapping enables the first process and the second process to share data through the shared virtual memory region;
update membership information associated with the data pipeline to include the first process and the second process;
receive, from the first process, an access request for accessing the shared virtual memory region;
grant or deny the access request based on one or more protection policies;
receive an unmapping request from the second process to unmap the shared virtual memory region from the second virtual address space of the second process;
responsive to the unmapping request, determine whether all members of the data pipeline consent to unmapping the shared virtual memory region from the second virtual address space of the second process;
responsive to a determination that all members of the data pipeline consent to the unmapping, unmap the shared virtual memory region from the second virtual address space of the second process; and
update the membership information associated with the data pipeline to remove the second process.

9. The media of claim 8, wherein the software is operable when executed to map the shared virtual memory region to the first virtual address space of the first process and the second virtual address space of the second process by:
after mapping the shared virtual memory region to the first virtual address space, adding the shared virtual memory region to the data pipeline;
receiving a second request from the second process to join the data pipeline; and
responsive to the second request, mapping the shared virtual memory region to the second virtual address space of the second process.

10. The media of claim 8, wherein the request to create the data pipeline is received from the first process.

11. The media of claim 8, wherein the shared virtual memory region is associated with a protection array, the protection array comprising one or more protection flags for each mapping of the shared virtual memory region; and
wherein the software is further operable when executed to:
determine, based on a first flag of the protection array associated with the mapping of the shared virtual memory region to the second virtual address space of the second process, whether access to the shared virtual memory region by the second process is granted or denied; and
responsive to a determination that access to the shared virtual memory region by the second process is granted, allow the second process to access the shared virtual memory region.

12. The media of claim 8, wherein the software is further operable when executed to:
receive a join request from a third process to join the data pipeline, wherein the join request comprises receiving a handle corresponding to an inter-process communication channel associated with the third process;
responsive to the join request, map the shared virtual memory region to a third virtual address space of the third process; and
update the membership information associated with the data pipeline to include the third process.

13. The media of claim 8, wherein the software is further operable when executed to:
receive a close request from the first process to close the data pipeline;
responsive to the close request, determine whether all members of the data pipeline consent to closing the data pipeline; and
responsive to a determination that all members consent to closing the data pipeline, close the data pipeline.

14. The media of claim 8, wherein the protection policies comprise one or more rules associated with read and write privileges of members of the data pipeline in the shared virtual memory region.

15. A system comprising:
one or more processors; and
one or more computer-readable non-transitory storage media coupled to one or more of the processors and comprising instructions operable when executed by one or more of the processors to cause the system to:
receive a request to create a data pipeline;
allocate a shared virtual memory region for the data pipeline;
map the shared virtual memory region to a first virtual address space of a first process and a second virtual address space of a second process, wherein the mapping enables the first process and the second process to share data through the shared virtual memory region;

update membership information associated with the data pipeline to include the first process and the second process;

receive, from the first process, an access request for accessing the shared virtual memory region;

grant or deny the access request based on one or more protection policies;

receive an unmapping request from the second process to unmap the shared virtual memory region from the second virtual address space of the second process;

responsive to the unmapping request, determine whether all members of the data pipeline consent to unmapping the shared virtual memory region from the second virtual address space of the second process;

responsive to a determination that all members of the data pipeline consent to the unmapping, unmap the shared virtual memory region from the second virtual address space of the second process; and update the membership information associated with the data pipeline to remove the second process.

16. The system of claim 15, wherein the request to create the data pipeline is received from the first process.

17. The system of claim 15, wherein the shared virtual memory region is associated with a protection array, the protection array comprising one or more protection flags for each mapping of the shared virtual memory region; and wherein the processors are further operable when executing the instructions to:

determine, based on a first flag of the protection array associated with the mapping of the shared virtual memory region to the second virtual address space of the second process, whether access to the shared virtual memory region by the second process is granted or denied; and responsive to a determination that access to the shared virtual memory region by the second process is granted, allow the second process to access the shared virtual memory region.

18. The system of claim 15, wherein the processors are further operable when executing the instructions to:

receive a join request from a third process to join the data pipeline, wherein the join request comprises receiving a handle corresponding to an inter-process communication channel associated with the third process;

responsive to the join request, map the shared virtual memory region to a third virtual address space of the third process; and update the membership information associated with the data pipeline to include the third process.

19. The system of claim 15, wherein the processors are further operable when executing the instructions to:

receive a close request from the first process to close the data pipeline;

responsive to the close request, determine whether all members of the data pipeline consent to closing the data pipeline; and responsive to a determination that all members consent to closing the data pipeline, close the data pipeline.

20. The system of claim 15, wherein the protection policies comprise one or more rules associated with read and write privileges of members of the data pipeline in the shared virtual memory region.

\* \* \* \* \*